United States Patent [19]

Wan et al.

[11] Patent Number: 5,621,769

[45] Date of Patent: *Apr. 15, 1997

[54] ADAPTIVE-SEQUENCE-ESTIMATION APPARATUS EMPLOYING DIVERSITY COMBINING/SELECTION

[75] Inventors: Yongbing Wan; Qingli Liu, both of Calgary, Canada

[73] Assignee: NovAtel Communications Ltd., Calgary, Canada

[*] Notice: The term of this patent shall not extend beyond the expiration date of Pat. No. 5,263,053.

[21] Appl. No.: 895,542

[22] Filed: Jun. 8, 1992

[51] Int. Cl.$^6$ ............................... H04L 1/02; H03D 1/00
[52] U.S. Cl. .................... 375/347; 375/341; 375/349; 455/133; 455/272; 371/43
[58] Field of Search .................... 375/260, 267, 375/346–349, 340, 231–232, 343, 341; 371/43; 455/133, 272, 137, 273, 277.2, 278.1, 132

[56] References Cited

U.S. PATENT DOCUMENTS

| | | | |
|---|---|---|---|
| 4,504,872 | 3/1985 | Peterson | 360/40 |
| 4,550,415 | 10/1985 | Debus, Jr. et al. | 375/234 |
| 4,564,952 | 1/1986 | Karabinis et al. | 375/232 |
| 4,584,713 | 4/1986 | Bruckert et al. | 455/272.2 |
| 4,710,945 | 12/1987 | Bocci et al. | 375/347 |
| 4,885,757 | 12/1989 | Provence | 375/343 |
| 5,031,193 | 7/1991 | Atkinson et al. | 375/231 |
| 5,111,481 | 5/1992 | Chen et al. | 375/232 |
| 5,150,381 | 9/1992 | Forney, Jr. et al. | 375/261 |
| 5,163,044 | 11/1992 | Golden | 370/32.1 |
| 5,191,598 | 3/1993 | Buckstram et al. | 375/347 |
| 5,202,903 | 4/1993 | Okanone | 375/347 |
| 5,203,027 | 4/1993 | Nounin et al. | 360/40 |
| 5,263,053 | 11/1993 | Wan et al. | 375/285 |

FOREIGN PATENT DOCUMENTS

0434040A2  6/1991  European Pat. Off. .

OTHER PUBLICATIONS

S. Narayan, "Fractionally Spaced Equalization for Analog Cellular Data Modems," IEEE Pacific Rim Conference on Communication, Computers and Signal Processing, May 9–10, 1991, pp. 534–537.

Sheen, Wern–Ho, "MLSE Equalization and Decoding for Multipath Fading Channels," *IEEE Transactions on Communications*, vol. 39, No. 10, Oct. 1991.

Jakes, W.C., Jr., Yeh, Y.S., Gans, M.J., Reudink, D.O., "Fundamentals of Diversity Systems," *Microwave Mobile Communications*, W.C. Jakes, ed., New York:Wiley 1974.

Forney, G. David, Jr., "Maximum–Likelihood Sequence Estiimation of Digital Sequences in the Presence of Intersymbol Interference," *IEEE Transactions on Information Theory*, vol. IT–18, No. 3, May 1972.

(List continued on next page.)

Primary Examiner—Wellington Chin
Assistant Examiner—William Luther
Attorney, Agent, or Firm—Cesari and McKenna, LLP

[57] ABSTRACT

A diversity receiver employing maximum-likelihood-sequence estimation employs a separate channel estimator (44-1, ..., 44-L) for each of a plurality of diversity channels. Each channel estimator (44-1, ..., 44-L) produces channel-model parameters ($[\hat{f}_1], \ldots, [\hat{f}_L]$) that characterize their respective channels. A weighting-and-accumulation circuit (56) computes the responses of the thus-represented models to candidate symbol sequences, and metrics indicating the likelihoods that respective candidate sequences were the sequences actually sent are determined by comparing the model output with the received signal in a comparison circuit (58) and squaring the magnitudes of the results in a squaring circuit (60). The receiver then employs a Viterbi algorithm (62) to determine which sequence is the one most likely to have been sent. In one version, it does this on the basis of the metrics calculated for the channel whose signal is strongest, while it determines the metrics by combining partial metrics from all of the channels in another version.

25 Claims, 6 Drawing Sheets

OTHER PUBLICATIONS

Magee, Francis R., Jr. and Proakis, John G., "Adaptive Maximum–Likelihood Sequence Estimation for Digital Signaling in the Presence of Intersymbol Interference," *IEEE Transactions on Information Theory*, Jan. 1973.

Eyuboglu, M. Vedat, and Qureshi, Shahid U.H., "Reduced–State Sequence Estimation with Set Partitioning and Decision Feedback," *IEEE Transactions on Communications*, vol. 36, No. 1, Jan. 1988.

ADAPTIVE-SEQUENCE-ESTIMATION APPARATUS EMPLOYING DIVERSITY COMBINING/SELECTION

BACKGROUND OF THE INVENTION

The present invention concerns recovery of digital sequences transmitted over a band-limited and dispersive radio channel. More specifically, it relates to employing both diversity reception and maximum-likelihood-sequence estimation for this purpose simultaneously.

Digital signals transmitted over a band-limited and dispersive radio channel are likely to experience noise corruption, intersymbol-interference (ISI) distortion, and multipath fading. A significant part of these effects results from a time-varying channel between the transmitter and receiver, and numerous techniques have been employed to reduce the less-desirable results of such time-varying channels. Two of those, namely, diversity reception and sequence estimation, are of particular interest here.

Diversity reception has been used for some time to reduce the effects of fading channels. In a time-varying channel, the signal from a given source can vary over time from a strong, clear signal to one that is so weak as to be buried in noise. Reliability of communication with such a source can be improved by employing multiple independent channels so that it is unlikely that all will be too weak at any one time to produce good results. Diversity can be provided, for instance, by using multiple antennas that are located and/or oriented differently. One can then choose the channel that currently is providing the greatest output power, for instance, or one can combine the various outputs, possibly by using weighting factors that depend on the various channels' output powers.

The sequence-estimation technique is exemplified, for instance, by the maximum-likelihood-sequence-estimation (MLSE) algorithm originally proposed in Forney, "Maximum-Likelihood Sequence Estimation of Digital Sequences in the Presence of Intersymbol Interference," *IEEE Trans. Inform. Theory*, vol. IT-18, pp. 363–78 (May 1972). An adaptive version of the MLSE algorithm was proposed by F. R. Magee and J. G. Proakis with reference to Proakis, *Digital Communications* (McGraw-Hill 1989). A simpler, sub-optimal approach referred to as "reduced-state sequence estimation" (RSSE) was described by Eyuboglu and Qureshi in "Reduced-State Sequence Estimation with Set Partitioning and Decision Feedback," *IEEE Trans. Comm.*, vol. COM-36, pp. 13–20 (January 1988).

The general approach employed in sequence estimation involves maintaining a model of the (typically time-varying) channel and applying to that model all of the sequences of symbols that the employed communications protocol permits. By computing "metrics" representing the differences between actually received signals and the model's responses to each hypothetical sequence, the sequence-estimation technique determines which sequence is the one most likely to have been transmitted.

In the adaptive sequence-estimation approaches, which are those typically employed for time-varying channels, the model is updated by comparing the received signal with the response of the model to a reference symbol sequence known to have been transmitted. Initially, a channel-impulse-response estimator, which maintains the model, is "trained" by using as a reference a predetermined sequence known to be transmitted during, for instance, certain "header" periods dictated by the communicative system's protocol.

Once the estimator has been "trained," some systems continue to adapt the model by "tracking." In the tracking mode, the channel-impulse-response estimator does not use a predetermined sequence as its reference. It instead uses the sequence that the sequence-estimation algorithm determines to have been sent. That is, it applies the thus-determined sequence to the currently prevailing model and compares the resultant output with (a delayed version of) the received signal that resulted in the determined receiver output. It continually adjusts the model in accordance with the difference between the received signal and the model output.

U.S. Pat. No. 5,031,193 to Atkinson et al. proposes the use of both diversity reception and sequence estimation in the same receiver. In the system described there, a separate set of equalizer tap gains is adaptively maintained for each of a plurality of diversity channels. Specifically, an equalizer in each channel filters the received signal in accordance with the tap gains maintained for that channel and thus removes the channel's distorting effects to some extent. In particular, it reduces phase differences among the channels. The equalized outputs of all channels are then applied to a diversity device, such as a device for computing the weighted sum of those equalized outputs, and the result is applied to a decision device, which performs some type of sequence estimation. Concurrently, a decision circuit in each channel determines from the resultant, equalized signal the symbols that must have been sent on that channel, and an adjustment algorithm compares the equalizer's output with these symbols and updates the parameters accordingly.

SUMMARY OF THE INVENTION

We have found a more effective way to combine diversity reception and sequence estimation. Specifically, we compute metrics for each channel individually, i.e., without equalizing the input signal before comparing it with the responses of the model to the various candidate sequences. The derived output sequence can then be determined from the resultant metrics by choosing the metrics from the highest-power path, combining the metrics for all of the paths, or performing some hybrid of both approaches. As a result, the benefits of diversity reception can be obtained in a sequence-estimation-type receiver without employing equalization before the sequence-estimation process. This avoids altering the statistics upon which the sequence-estimation process depends and thereby optimizes that process's performance.

This invention does not require that separate symbol decisions be made for all channels. Indeed, it is preferable not to do so; in accordance with one aspect of the invention, the reference sequence used during tracking periods for all channels' channel-impulse-response estimators is the common sequence-estimation output. By employing this approach, the individual channels' impulse-response estimation can be performed more effectively, because determination of the reference values upon which they are based benefits from information from the strongest channels rather than only from the single, associated channel, which may currently be in deep fade.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
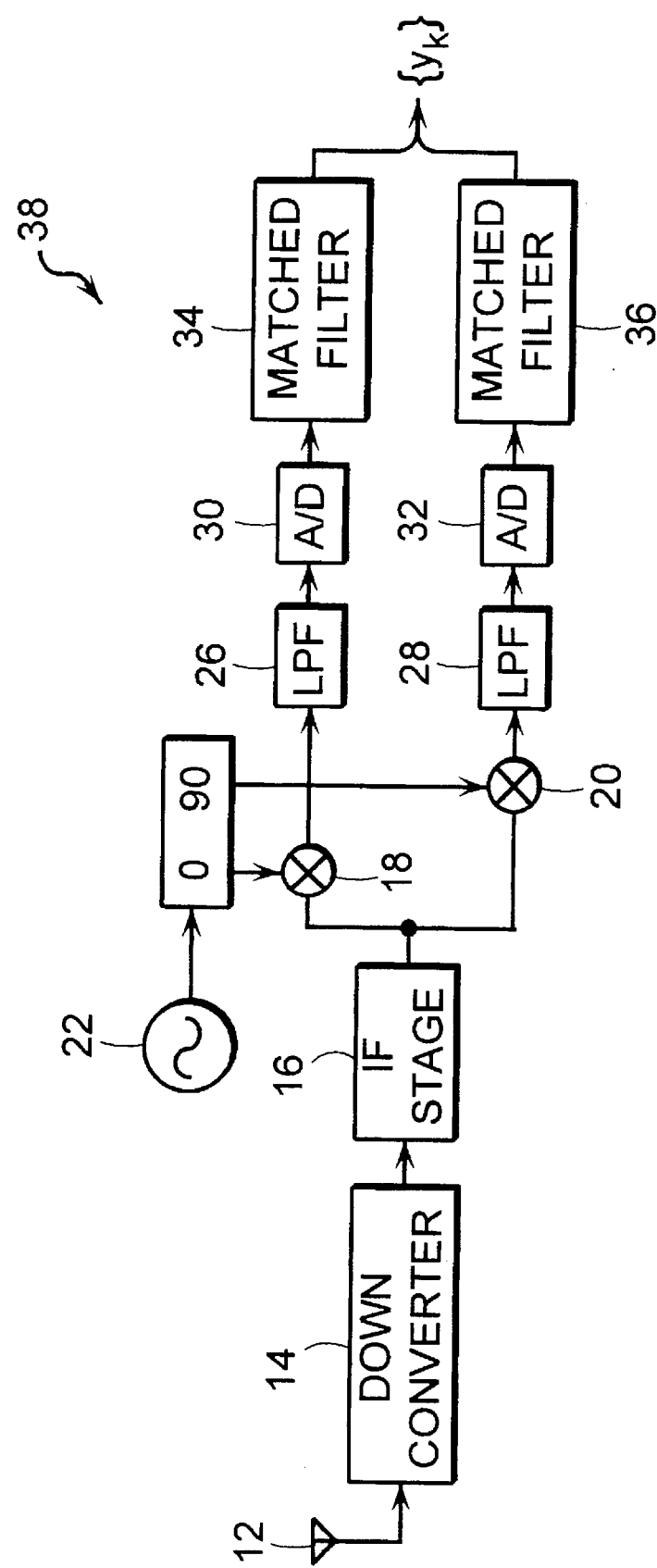
FIG. 1 is a block diagram of front-end circuitry of the type employed in one type of receiver in which the present invention can be implemented.

To place the diversity apparatus of the present invention in context, FIG. 1 depicts the front-end circuitry for one channel of a diversity receiver. For the sake of concreteness, we will assume that the receiver is one for recovering differential quadrature phase-shift-keying (DQPSK) signals, although it will be apparent that the invention does not at all depend on the particular modulation scheme employed.

An antenna 12 receives the radio-wave signal and applies it to a down converter 14, which produces an intermediate-frequency signal that an IF stage 16 amplifies. The IF stage 16 applies its output to mixers 18 and 20, which receive in-phase and quadrature components of the output of an oscillator 22 to produce in-phase and quadrature signal components.

Low-pass filters 26 and 28 pass only the baseband components of the resultant mixed signals, and analog-to-digital converters 30 and 32 sample the resultant baseband signals, digitize them, and apply the resultant discretely timed digital samples to respective digital matched filters 34 and 36, which are so related to pulse-shaping filters in the transmitter as to form respective Nyquist filters therewith for purposes well known to those skilled in the art.

The outputs of the two matched filters 34 and 36 are collectively thought of as a single, complex output $y_k$, and the circuitry described so far for producing the samples $y_k$ will be referred to as the front-end circuit 38.

A separate front-end circuit 38 for each channel produces a respective front-end output sequence $\{y_k\}$. We will assume that there are L diversity channels, the lth channel producing a received-signal sequence $\{y_k^l\}$.

Figure 2:
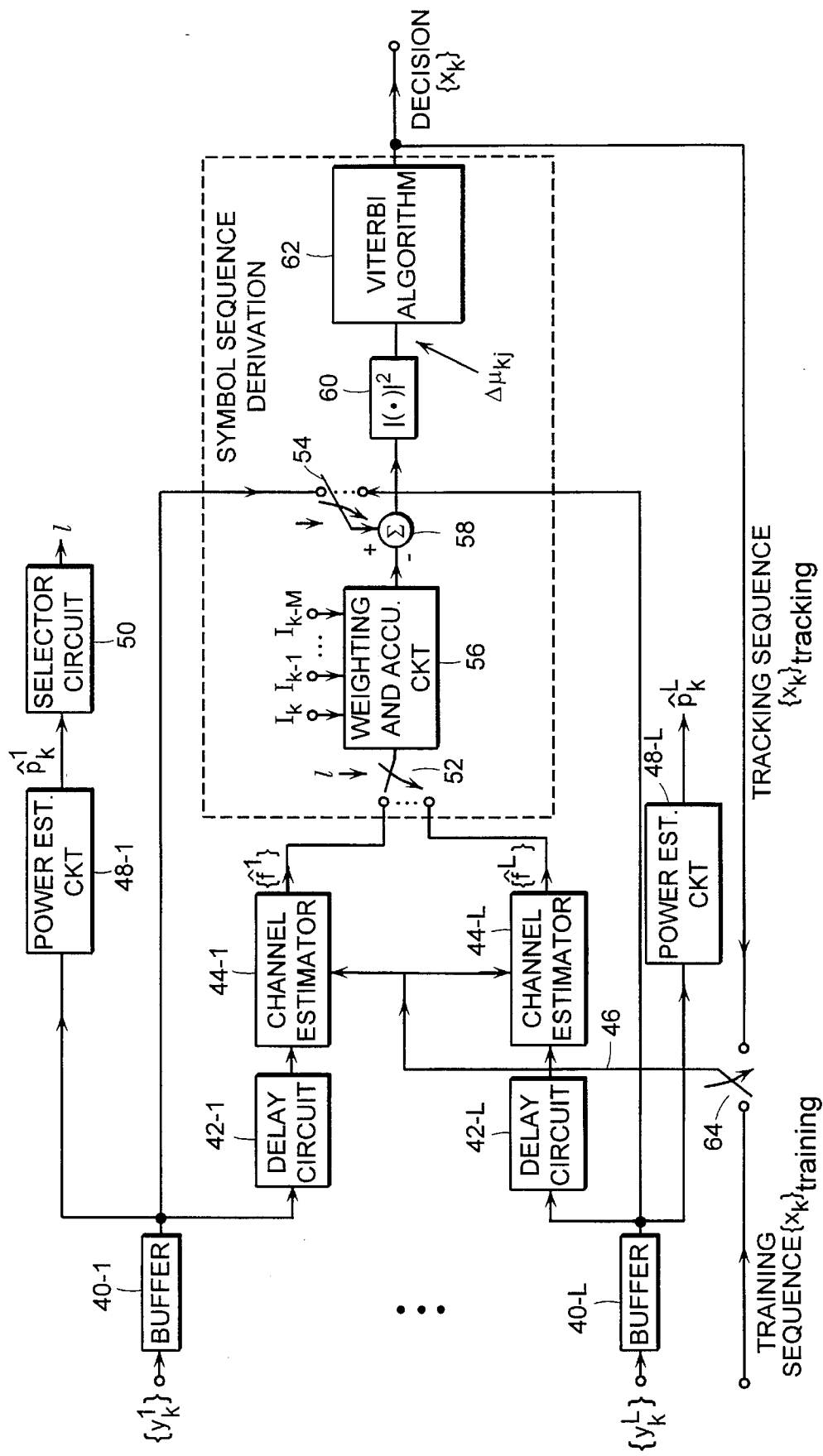
FIG. 2 is a block diagram of a selection-type diversity receiver that employs the present invention.

FIG. 2 depicts the remainder of the processing for each channel, to which the teachings of the present invention are more particularly directed. As is conventional, it uses different blocks to represent different functions, and these will, for ease of description, be referred to herein as respective circuits, which they could in fact be. In most implementations, however, many of the separately depicted "circuits" will actually be embodied in a common physical device, such as a general-purpose digital-signal-processing integrated circuit. The particular embodiment of FIG. 2 employs diversity selection rather than combining, although it will become apparent that the teachings of the present invention can be employed for combining, too, as well as for hybrids of both approaches. Moreover, that embodiment and all others described herein employ the MLSE technique, but those skilled in the art will recognize that the present invention is readily adapted to RSSE, too, or to any similar sequence-estimation approach based on probability-indication metrics.

A buffer 40-1 in the first channel and corresponding buffers 40-1 in each lth channel receive respective front-end sequences $\{y_k^l\}$ whose functions will be described below. Delay circuit 42-1 delays the buffer output in the first channel, for purposes that also will be explained presently, and applies them to a channel estimator 44-1, which also receives a reference sequence on line 46 and thereby determines, in a manner known to those skilled in the art but briefly described below, a set $[\hat{f}^1]$ of channel parameters. In the embodiment depicted in FIG. 2, a power-estimation circuit 48-1 determines the average power in the first channel and generates an output $\hat{p}_k^1$ that represents this power value.

Power estimation can be performed in any of a number of ways. For instance, it can periodically take a predetermined number of samples, square their average, and produce $\hat{p}_k^1$ as the result. Alternately, it may implement a low-pass filter such as $$\hat{p}_k^1 = \lambda \hat{p}_{k-1}^1 + (1-\lambda)|y_k|^2,$$

where $\lambda$ is a "forgetting" factor between 0 and 1. Of course, channel power does not have to be determined from the $y_k^l$ values; it could be measured, for instance, at the IF stage.

The outputs of all of the power-estimation circuits 48-1 are applied to a common selection circuit 50, which identifies the channel having the largest $\hat{p}_k$ value and operates switches 52 and 54 accordingly. Specifically, switch 52 connects a weighting-and-accumulation circuit 56 to the channel estimator 44 of the channel whose power estimate $\hat{p}_k$ is greatest, and switch 54 connects a subtraction circuit 58 to the output of the buffer 40 of the same channel. The switch will in many embodiments be permitted to change only at predetermined intervals. We call the signal input during a single such interval a burst. The length of the burst is chosen empirically to achieve best receiver performance. If the length is overly long, the advantage of diversity reception over single-channel reception will not be very significant. If the length is too short, such as the duration of only a single symbol, the random characteristics of noise will degrade the performance of the sequence-estimation algorithm. In embodiments in which the channel selection for a given burst is to be based on the power during that burst rather than on that during the previous burst, each burst will have to be accumulated before further processing commences, and this is the purpose of buffers 40.

The purpose of circuits 56 and 58 and a squaring circuit 60 is to generate J "branch metrics" $\Delta\mu_{kj}$ for each symbol time where J is the number of candidate sequences. These branch metrics' purpose is well known to those familiar with the sequence-estimation process, but a brief discussion follows.

Figure 3:
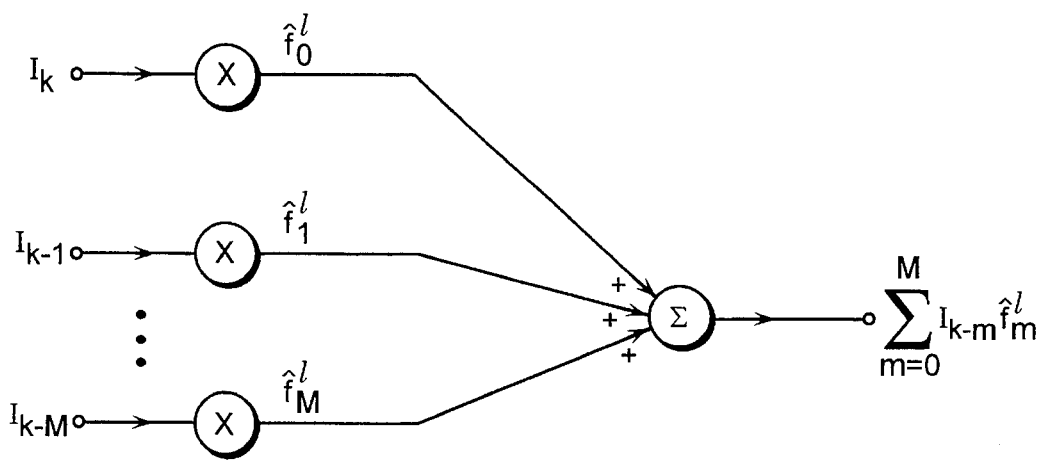
FIG. 3 is a block diagram that illustrates the weighting-and-accumulation circuit in the receiver of FIG. 2.

Suppose that the channel between the transmitter and receiver has a "memory" of M symbol periods. That is, suppose that the output of that channel—i.e., the signal received at the receiving antenna—depends not only on the symbol input that the transmitter currently applies to it but also on the previous M symbols without also being dependent on any symbols before that. Assume also that the (time-varying) channel between the transmitter and the first component receiver can be characterized by channel parameters $[\hat{f}_k^l]$, i.e., that the response of that channel to a candidate sequence $\{I_{k-M} \ldots I_k\}$ in the absence of noise can be computed as FIG. 3 depicts. For each received value $y_k^l$ of the channel 1 that switches 52 and 54 choose, the weighting-and-accumulation circuit 56 receives every one of the $J=N^{M+1}$ possible sequences $\{I_{k-M}, \ldots, I_k\}$ of symbols chosen from an N-symbol alphabet that could have been sent, so the outputs of the weighting-and-accumulator circuit 56 are the responses to those sequences that the time-varying channel would produce in the absence of noise, and the outputs of subtraction circuit 58 are the differences between those values and the outputs that the channel actually produced.

If the noise is assumed to be Gaussian, therefore, the outputs $\Delta\mu_{kj}$ of circuit 60, which computes the square of the absolute value, are proportional to the logarithms of the probabilities that respective sequences $\{I_{k-M}, \ldots, I_k\}$ are the transmitted sequence that resulted in the value $y_k^l$ actually observed. A Viterbi-algorithm circuit 62 employs these "branch metrics" $\Delta\mu_{kj}$ in the known manner to determine the sequence $\{x_k\}$ actually transmitted.

Figure 4:
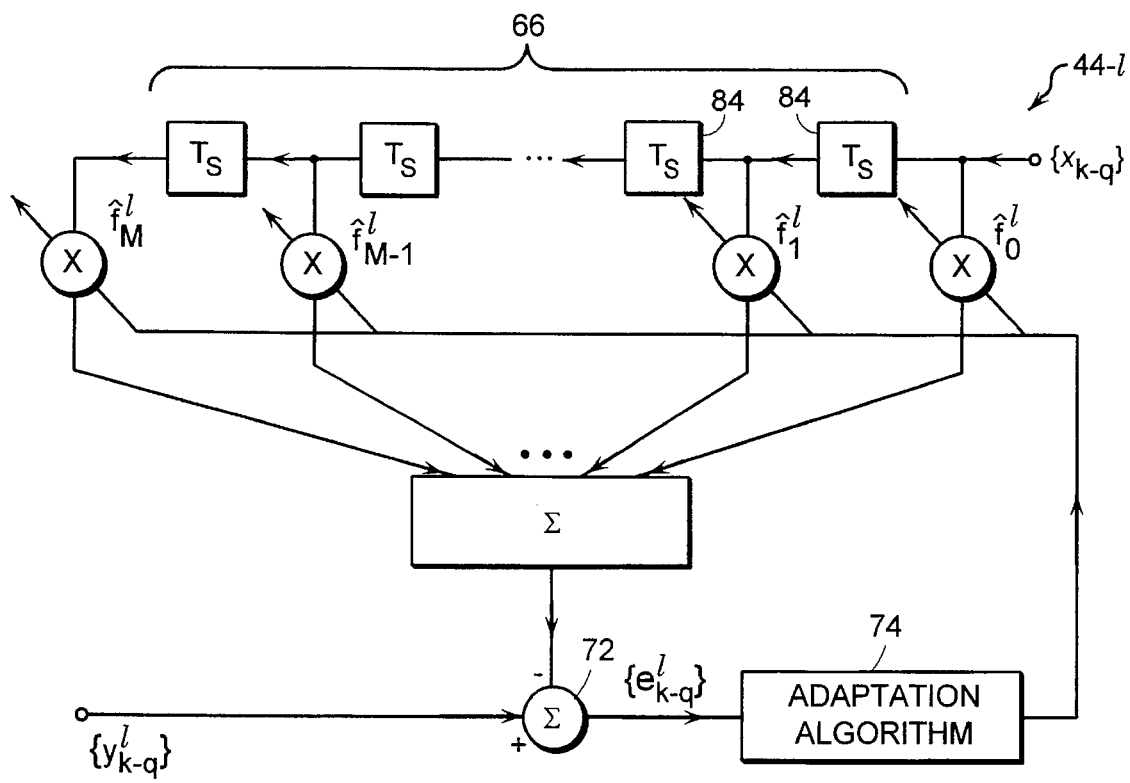
FIG. 4 is a block diagram of the channel-impulse-response estimator in the receiver of FIG. 2.

The channel estimator 44-1 determines the channel-characterizing parameters $[\hat{f}^l]$ in a manner that FIG. 4 depicts. Its operation is typically initialized during a "header" sequence in the transmission protocol. Periodically, certain predetermined, "header" sequences are transmitted for purposes not relevant here, and a switch 64 depicted in FIG. 2 assumes the state there illustrated to apply to the channel estimator 44 a training sequence $\{x_k\}_{training}$, which is the predetermined header sequence. This is applied to an M-stage delay circuit 66, whose successive tap outputs are multiplied by respective ones of the channel-model parameters $\hat{f}_m^l$, and adder 70 computes the sum of these products to determine what the currently prevailing model "predicts" as the response of the channel to this predetermined sequence. A subtraction circuit 72 computes the difference between this "predicted" value and the value y actually observed, and an adaptation algorithm 74 of one of the types known in the art computes from the resultant error e and the current parameters $[\hat{f}]$ what the updated values of those parameters are to be.

After this training period, switch 64 of FIG. 2 is operated to the other position, in which it applies as the reference sequence the decisions of the Viterbi-algorithm circuit 62. The Viterbi algorithm is typically characterized by a delay of q symbol periods, so the input to the channel estimator 44-1 at time k is $x_{k-q}$. This is the reason for the delay circuit 42-1 of FIG. 2: it imposes a delay of q symbol periods so that each value of the input y to the difference circuit 72 of FIG. 4 is aligned in time with the symbol-decision input x estimated to have caused that y value.

Perusal of the circuit of FIG. 2 reveals several of the benefits of the present invention. If only the currently selected channel is considered, the apparatus of FIG. 2 operates in a manner exactly the same as that in which a conventional MLSE receiver does. That is, the MLSE algorithm directly receives the received signal y without any intermediate equalization of the type interposed in the Atkinson et al. arrangement. Thus, no alteration of the fading-signal statistics occurs, and the capability of the MLSE algorithm is not thereby compromised.

If the other, non-selected channels are considered, another advantage of the invention becomes apparent. Specifically, the reference sequence upon which the non-chosen channel estimators 44-1 update their parameters is based on output of the strongest-signal channel and thus is more likely to be accurate than symbol decisions based only on a non-chosen channel. When a previously non-chosen channel subsequently produces the strongest output, therefore, its model is likely to be more accurate than it would have been if it had merely been updated in the normal manner.

Figure 5:
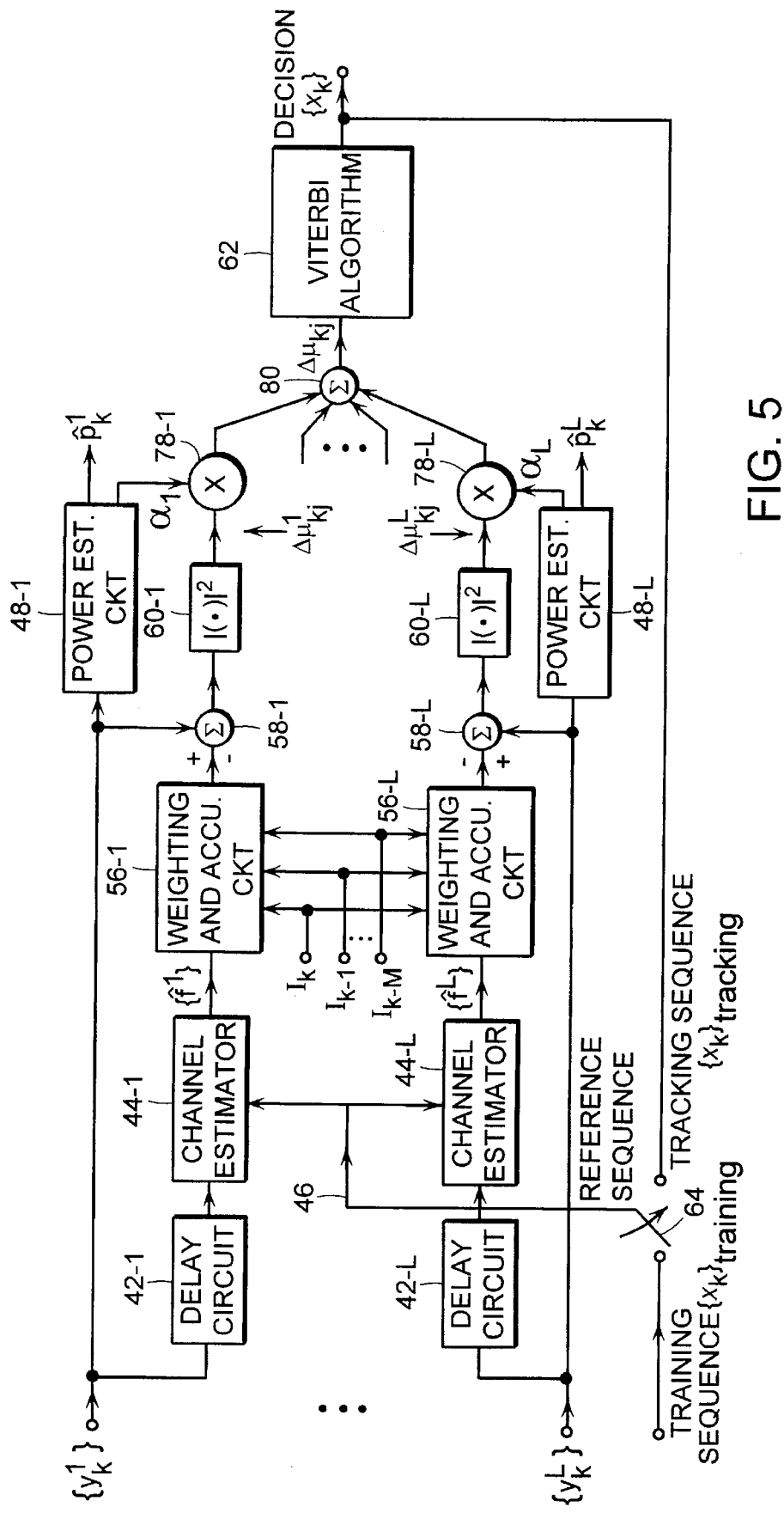
FIG. 5 is a block diagram of a combining-type diversity receiver that employs the teachings of the present invention.

The present invention affords these advantages not only for diversity selection but also with diversity combining, as will be appreciated by reference to FIG. 5.

Components in FIG. 5 identical to those in FIG. 2 have the same reference numerals. They operate similarly, so a description of the common aspects of their operation will not be repeated here. The major difference between the arrangements of FIGS. 2 and 5 is that the MLSE portion includes not just a single weighting-and-accumulation circuit 48 as in FIG. 2 but a plurality of them 48-1, . . . , 48-L, together with associated subtraction circuits 58-1, . . . , 58-L and squaring circuits 60-1, . . . , 60-L. That is, branch metrics are calculated for all of the channels, not just for a single, selected channel. More precisely, for the jth candidate sequence $\{I_{k-M}, \ldots I_x\}$, a partial branch metric $\Delta\mu_{kj}^l$ is computed for each channel.

Multipliers 78-1 through 78-L weight these partial branch metrics by respective weighting values $\alpha_k^l$, which can simply be the $\hat{p}_k^l$ values described above normalized so that their sum yields a predetermined value. Of course, one way to combine diversity signals is simply to add them together with equal weight, and such an approach would, of course, not require multipliers 78. A summation circuit 80 adds these weighted values together to produce the total branch metric $\Delta\mu_{kj}$, which is used as before in the Viterbi algorithm. Otherwise, the operation of the diversity combining circuit is the same as that of the diversity selection apparatus of FIG. 2.

One might also employ a hybrid of the versions of FIGS. 2 and 5. One approach, for instance, might use the combining arrangement of FIG. 5 in all cases except those in which the $\hat{p}_k$ value exceeds an upper threshold $P_1$ while all of the others are less than a lower threshold value $P_0$, in which case the lth channel is selected for operation in the FIG.-2 manner.

The foregoing discussion tacitly assumes that the matched filters 34 and 36 of FIG. 1 produce a new output $y_k$ once each symbol period $T_s$. However, as is indicated in U.S. patent application Ser. No. 856,526 filed on Mar. 24, 1992, by Wan et al. for a Fractionally Spaced Maximum Likelihood Sequence Estimation Receiver, which we hereby incorporate by reference, the MLSE approach can be practiced in a "fractionally spaced" manner. This means that the channel-model parameters $[\hat{f}]$ include values $\hat{f}_m$ that correspond not only to symbol times but also to instants between those symbol times. Specifically, the channel estimator is of the type depicted in FIG. 6. Components of FIG. 6 have as reference numerals primed versions of those for corresponding components of FIG. 4. Each of the delay stages 82 in FIG. 6 corresponding to stages 84 in FIG. 4 imposes a delay of only $T_s/K$, where K is the oversampling rate at which the fractionally spaced receiver operates. That is, if M is again the channel's "memory" length in symbol periods, then the number of parameters $\hat{f}_m$ in any set is KM, as the Wan et al. application mentioned above explains.

Figure 6:
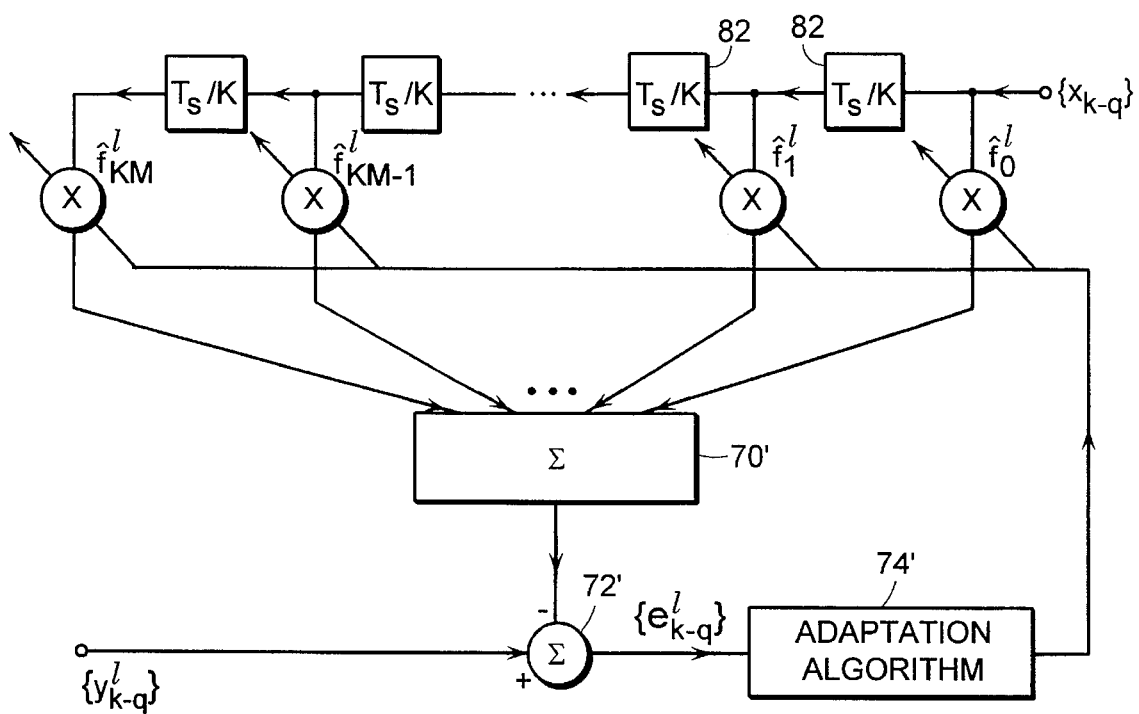
FIG. 6 is a block diagram of a channel-impulse-response estimator of the type employed in fractionally spaced versions of the present invention.

As that application also explains, one or both of the inputs to the channel-impulse-response estimator 44-1' of FIG. 6 are fractionally spaced. In the case of received values y applied to the channel-impulse-response estimator, the fractional spacing results naturally from using all of the values produced by oversampling the input as was just explained. A typical way to obtain a fractionally spaced reference sequence, on the other hand, is to apply the sequence of reference symbols to an interpolator in the form of the Nyquist filter that results from concatenation of the receiver matched filter with the transmitter's pulse-shaping filter, as is described in the Wan et al. application.

Figure 7:
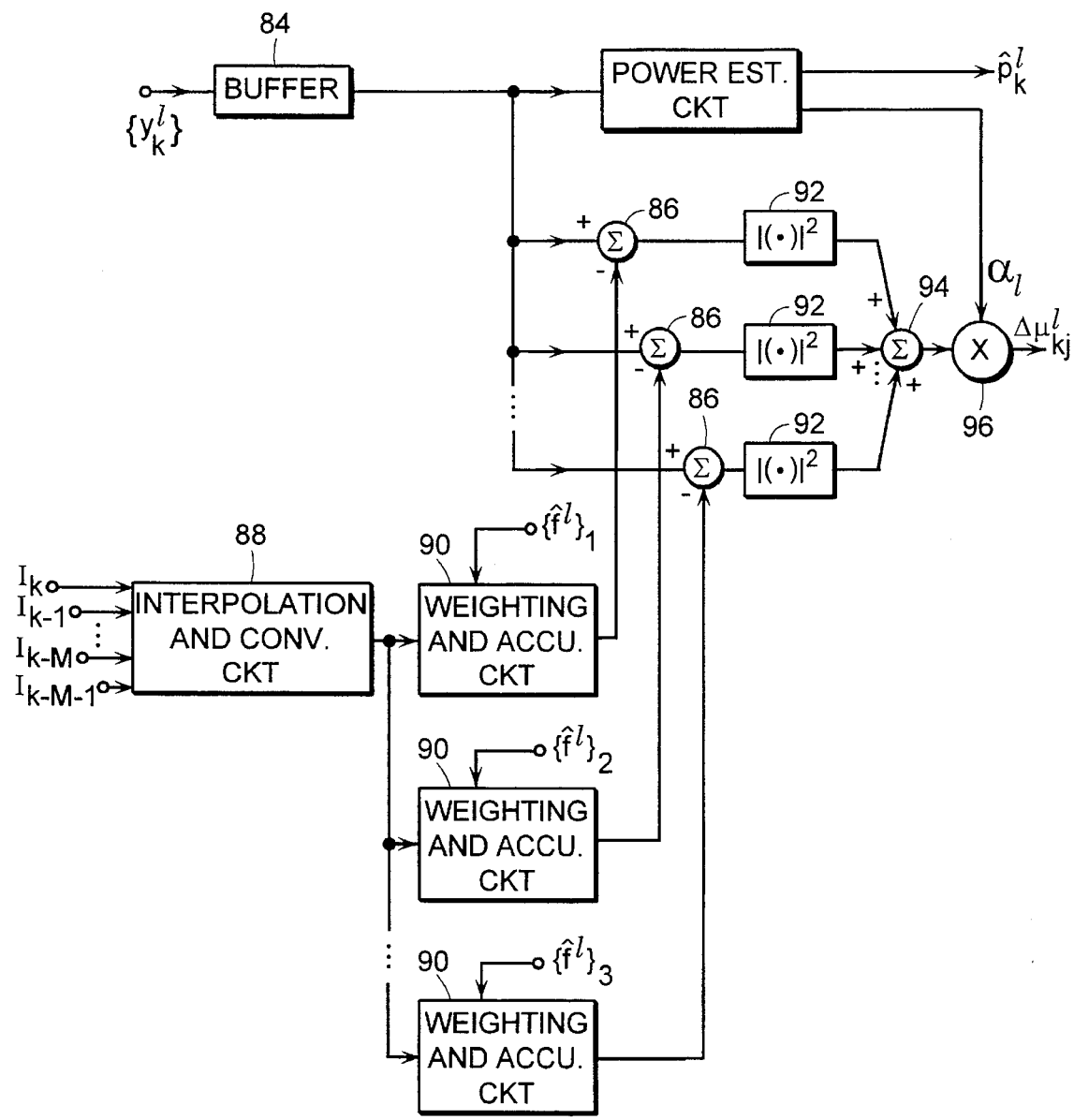
FIG. 7 is a block diagram of a metric-calculation circuit of a type that can be employed in fractionally spaced versions of the present invention.

FIG. 7 depicts a circuit employed to calculate the partial branch metric $\Delta\mu_{kj}^l$ for the lth diversity channel in a fractionally spaced MLSE apparatus. Since there are K received samples in one symbol period, all of them can be used to calculate the partial branch metric $\Delta\mu_{kj}^l$. Specifically, a buffer 84 stores the K samples produced during a symbol period and applies each to a different difference circuit 86, which compares it with the response of a model to a respective subsequence of a fractionally spaced sequence that an interpolation circuit 88 produces by applying the Nyquist-filter response to a symbol-spaced candidate sequence, as the Wan et al. application mentioned above explains in more detail.

As that application also explains, the same set $[\hat{f}^l]$ of channel-model parameters may not be applied to all of the subsequences of the interpolator-88 output used to generate the different inputs to difference circuits 86. In some embodiments, the "current" set of channel-model parameters that the channel-impulse-response estimator of FIG. 6 updates at a given fractional symbol time is not the set that was updated at the previous fractional symbol time but is instead the set that was updated at the corresponding fractional symbol time during the previous symbol period. That is, K different sets of channel parameters $[\hat{f}^l]_k$ may be maintained for each channel, each of them being updated once each symbol period so that K updates in total are performed in each symbol period. For this reason, FIG. 7 depicts K sets of channel parameters $[\hat{f}^l]_k$ and K corresponding weighting and accumulation circuits 90.

The output of each difference circuit 86 is the difference between the model output and the actually observed output at a different time within a symbol period, and respective squaring circuits 92 compute the squares of the absolute values of those differences. The resultant values are added together in a summation circuit 94. The resultant value is the branch metric used for diversity selection. FIG. 7, however, depicts a diversity-combining version, in which a multiplier 96 weights the result by the weighting factor $\alpha^l$ for that channel.

The input to the interpolation circuit 88 is shown as including not only $I_{k-M}, \ldots, I_k$ but also $x_{k-M-1}$. This reflects the fact that the fractionally spaced candidate sequence may extend a fraction of a symbol period farther back than the channel "memory," and a symbol value needed to interpolate certain of the earliest fractional values may be a symbol $x_{k-M-1}$ that has already been determined by the MLSE algorithm. Thus, although M+2 sequence values are shown in the candidate sequence, there are only $N^{N+1}$ possible sequences for which branch metrics are to be calculated, not $N^{M+1}$, because $x_{k-M-1}$ is the same for all sequences.

By employing the teachings of the present invention, therefore, one can obtain the complete benefits of the MLSE or other sequence-estimation algorithm while employing diversity selection or combination, and these results can be obtained in a wide range of embodiments. The invention thus constitutes a significant advance in the art.

What is claimed is:

1. For recovering transmitted symbols from received signals that result from transmission, through channels characterized by multipath fading, of successive symbols during symbol intervals spaced in time by a predetermined symbol period, a receiver comprising:

A) a plurality of front-end circuits for receiving respective ones of the signals and producing respective fractionally spaced front-end samples therefrom;

B) a plurality of channel-impulse-response estimators, each associated with a respective front-end circuit and adapted for application of reference values thereto, for generating channel-model signals representative of a respective set of fractionally spaced channel-model parameters that represent a model associated with that estimator that characterizes the channel from which its associated front-end received its input signal, for comparing the front-end output of its associated front-end circuit with the response of its associated models to the reference values, and for updating those channel-model parameters in accordance with the results of the comparisons; and C) a symbol-sequence-derivation circuit responsive to the channel-model signals for determining, for each of a plurality of candidate symbol sequences, an associated response of each model to the response of a fractionally spaced Nyquist filter to that candidate symbol sequence, for calculating metrics for candidate symbol sequences by comparing their associated responses with the front-end samples, for determining, from the metrics thus calculated, which candidate symbol sequence is most likely to have resulted in the front-end samples, and for applying a reference-sequence output determined thereby to each channel-impulse-response estimator as its reference values.

2. A receiver as defined in claim 1 wherein the receiver selects a single chosen channel from among the channels and computes the metrics, for any given symbol interval, from the responses of only the model that characterizes the chosen channel.

3. A receiver as defined in claim 2 wherein the symbol-sequence-derivation circuit performs the selection among the channels in accordance with the powers of the respective signals that they convey.

4. A receiver as defined in claim 3 wherein each front-end circuit includes an intermediate-frequency stage, and the symbol-sequence-derivation circuit makes its selection among the channels in accordance with the power sensed at the respective intermediate-frequency stages.

5. A receiver as defined in claim 3 wherein the symbol-sequence-derivation circuit makes its selection among the channels in accordance with their respective power levels as determined from the values of the front-end samples.

6. A receiver as defined in claim 2 wherein the symbol-sequence-derivation circuit employs the Viterbi algorithm to determine the candidate sequence most likely to have resulted in the front-end samples.

7. A receiver as defined in claim 2 wherein the symbol-sequence-derivation circuit employs the reduced-state sequence-estimation technique to determine the candidate sequence most likely to have resulted in the front-end samples.

8. A receiver as defined in claim 1 wherein, for at least some symbol intervals, the symbol-sequence-derivation circuit calculates partial metrics from the responses of each of a plurality of the models and combines the partial metrics to obtain the metrics.

9. A receiver as defined in claim 8 wherein the symbol-sequence-derivation circuit calculates the metrics by weighting all of the partial metrics equally.

10. A receiver as defined in claim 8 wherein the symbol-sequence-derivation circuit calculates the metrics for at least some symbol intervals by combining the partial metrics with different weights.

11. A receiver as defined in claim 10 wherein the symbol-sequence-derivation circuit combines the partial metrics in accordance with weights determined by the signal powers of their respective channels.

12. A receiver as defined in claim 8 wherein the symbol-sequence-derivation circuit employs the Viterbi algorithm to determine the candidate sequence most likely to have resulted in the front-end samples.

13. A receiver as defined in claim 8 wherein the symbol-sequence-derivation circuit employs the reduced-state sequence-estimation technique to determine the candidate sequence most likely to have resulted in the front-end samples.

14. A receiver as defined in claim 8 wherein, for some symbol intervals, the symbol-sequence-derivation circuit calculates the metrics from the responses of only a single one of the models.

15. A receiver as defined in claim 14 wherein, during those symbol intervals in which the symbol-sequence-derivation circuit calculates the metrics from the responses of only a single one of the models, the selection of the single one of the models from whose responses the symbol-sequence-derivation circuit calculates the metrics is made in accordance with the powers of the signals conveyed by the channels that the models characterize.

16. A receiver as defined in claim 14 wherein the symbol-sequence-derivation circuit employs the Viterbi algorithm to determine the candidate sequence most likely to have resulted in the front-end samples.

17. A receiver as defined in claim 14 wherein the symbol-sequence-derivation circuit employs the reduced-state sequence-estimation technique to determine the candidate sequence most likely to have resulted in the front-end samples.

18. A receiver for receiving signals transmitted in bursts over a plurality of channels, the receiver including:
    A) for each of the plurality of channels, a channel-impulse-response estimator that includes model parameters that represent a model of that channel;
    B) a symbol-sequence-derivation circuit for
        (i) determining, for each of a plurality of candidate symbol subsequences representing a portion of one of the bursts, an associated response of each channel estimator model to that candidate symbol sub-sequence,
        (ii) calculating metrics associated with each candidate sub-sequence, the metrics based on the responses of the channel estimator models,
        (iii) determining, from the metrics, which candidate sub-sequence is the most likely, and
        (iv) applying as a reference signal to all of the channel-impulse-response estimators a signal based on the same, single most likely candidate sub-sequence, to update the model parameters produced by the channel-impulse-response estimators,
    each channel-impulse-response estimator updating its model based on each of the reference signals received from the symbol-sequence-derivation circuit.

19. The receiver of claim 18 wherein the symbol-sequence-derivation circuit further includes means for weighting the metrics before determining the most likely candidate sub-sequence.

20. A receiver for receiving front-end signals transmitted in bursts over a plurality of channels, the receiver including:
    A) for each of the plurality of channels, a channel-impulse-response estimator that includes model parameters that represent a model of that channel;
    B) means for selecting a channel; and
    C) a symbol-sequence-derivation circuit for
        (i) determining, for each of a plurality of candidate symbol sub-sequences representing a portion of one of the bursts, an associated response of each channel estimator model to that candidate symbol sub-sequence,
        (ii) calculating metrics associated with each candidate symbol sub-sequence, the metrics being based on the responses of the channel estimator for the selected channel, and refraining from calculating metrics for the channels not selected,
        (iii) determining, from the metrics, which candidate symbol sub-sequence is the most likely, and
        (iv) applying as a reference signal to all of the channel-impulse-response estimators a signal based on the same, single most likely candidate symbol sub-sequence, to update the model parameters produced by the channel-impulse-response estimators,
    each channel-impulse-response estimator updating its model based on each of the reference signals received from the symbol-sequence-derivation circuit.

21. A receiver as defined in claim 20 wherein the symbol-sequence-derivation circuit performs the selection among the channels in accordance with the powers of the respective signals that they convey.

22. A receiver as defined in claim 21 wherein each front-end circuit includes a respective intermediate-frequency stage, and the symbol-sequence-derivation circuit makes its selection among the channels in accordance with the power sensed at the respective intermediate-frequency stages.

23. A receiver as defined in claim 21 wherein the symbol-sequence-derivation circuit makes its selection among the channels in accordance with their respective power levels as determined from the values of the front-end signals.

24. A receiver as defined in claim 20 wherein the symbol-sequence-derivation circuit determines the candidate sequence most likely to have resulted in the front-end signals by employing the Viterbi algorithm.

25. A receiver as defined in claim 20 wherein the symbol-sequence-derivation circuit employs the reduced-state sequence-estimation technique to determine which of the candidate symbol sequences is most likely to have resulted in the front-end signals.

* * * * *